July 22, 1958 J. AVINS 2,844,739

SAWTOOTH CURRENT WAVE GENERATOR

Filed July 1, 1953

INVENTOR.
JACK AVINS
BY [signature]
ATTORNEY

United States Patent Office 2,844,739

Patented July 22, 1958

2,844,739

SAWTOOTH CURRENT WAVE GENERATOR

Jack Avins, Staten Island, N. Y., assignor to Radio Corporation of America, a corporation of Delaware Application July 1, 1953, Serial No. 365,430

The terminal fifteen years of the term of the patent to be granted has been disclaimed 1 Claim. (Cl. 307—88.5)

This invention relates to sawtooth current wave generators and, more particularly, to sawtooth current wave generators of the type employing a bi-directionally conductive switch.

In Patent 2,728,857, issued on December 27, 1955, of George C. Sziklai, Serial No. 308,618, filed September 9, 1952, and entitled Electronic Switching, circuits employing a transistor as a bi-directional switch are disclosed. In a particular embodiment of the invention therein disclosed a transistor functioning as a bi-directional switch is utilized to periodically open and close a circuit including an inductance coil and a D.-C. source. When bias on the transistor is such as to first close this circuit, current flowing through the inductance coil increases at a substantially linear rate. When the bias is reversed, as under the influence of a suitable trigger pulse, the circuit is opened and the inductance coil is permitted to resonate with its shunt capacity for half of an oscillation cycle. As bias then returns to its normal polarity, current flows through the inductance coil in the opposite direction, now decreasing at a linear rate until current equilibrium is reached. The functional cycle then re-commences with current flow through the inductance coil in the original direction, again increasing at a substantially linear rate. The current waves generated in the inductance coil thus have a substantially sawtooth waveform. The generation of this sawtooth waveform is markedly efficient, since substantially all of the energy from the D.-C. source which is stored in the inductance during a portion of the operating cycle is returned to the source during a later portion of the operating cycle. Theoretically, if there were no resistance in the load circuit no external energy other than the switching pulses is required to provide the sawtooth current wave. However, since there necessarily will be some resistance in the load circuit, some energy losses will occur therein with a slight resultant drain on the D.-C. source to replace these losses.

In sawtooth current wave generators of the above described type, the width or time duration of the trigger pulses applied to the bi-directional switch is significant, inasmuch as accurate, efficient operation of the circuit requires that the pulse duration be equal to half the resonance period for the inductance coil and its shunt capacity. The present invention is directed toward an improvement in sawtooth current wave generators of this type, wherein the time duration of the trigger pulses is rendered less critical.

In accordance with an embodiment of the invention, a voltage pulse of appropriate polarity derived from the inductance coil during the retrace period (i. e., when the bi-directional switch is open) is applied to the switch control circuit in addition to the incoming trigger pulse so as to insure that the period of switch-open condition coincides with the duration of a half cycle of oscillation in the inductance coil and its shunt capacity. Since the termination of a retrace pulse of appropriate polarity always occurs at the precise time when the current in the inductance coil reaches its peak in the "reverse" direction, the trailing edge of the retrace pulse insures proper timing of the switch closing operation, so long as the trigger pulse duration is less than the predetermined half cycle period. Thus, the trigger pulse duration is rendered noncritical, so long as it does not exceed the half cycle oscillation period. Hence, in effect, the leading edge of the trigger pulse determines the timing of the opening of the bi-directional switch (i. e., determines the timing of the start of the retrace interval); whereas the trailing edge of the retrace pulse determines the time of the closing of the bi-directional switch (i. e., determines the timing of the termination of the retrace interval). Accurate and efficient generation of substantially symmetrical sawtooth current waveforms is thus insured without rigid requirements on the width of actuating pulses.

Accordingly, it is a primary object of the present invention to provide an improvement in sawtooth current generators insuring efficiency, accuracy, symmetry and regularity in operation.

An additional object of the present invention is to provide an improved system for generating in an inductance coil a sawtooth current waveform suitable for deflection, wherein an incoming trigger pulse initiates the retrace portions of the sawtooth waveform, but wherein a feedback pulse derived from the inductance coil terminates the retrace portion after a fixed time interval.

Another object of the present invention is to provide an improved system for generating deflection waveforms with an efficiency independent of synchronizing pulse width.

Other objects and advantages of the present invention will be readily apparent to those skilled in the art upon a reading of the following detailed description and an inspection of the accompanying drawings, in which.

Figure 1:
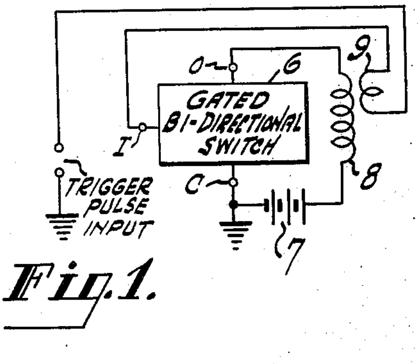
Fig. 1 illustrates in block and schematic form a sawtooth current generator of the type employing a gated bi-directional switch, providing a generalized embodiment of the principles of the present invention.
Figure 3:
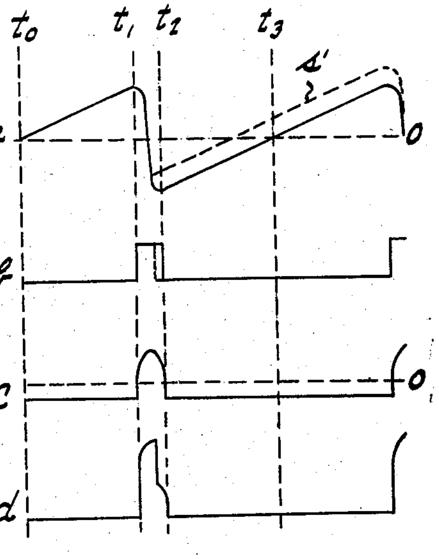
Fig. 3 illustrates graphically voltage and current waveforms associated with the operation of the sawtooth current wave generators illustrated in Figs. 1 and 2.

Referring to Fig. 1 in greater detail for appreciation of general principles of the present invention, a gated bi-directional switch 6 is illustrated in block form, the switch being of the type having an input terminal I, an output terminal O and a common terminal C. While particular details of the form which the switch 6 may take will be subsequently described, for purposes of the present general explanation, it may be assumed that the opening and closing of a load circuit connected between the output terminal O and the common terminal C is subject to the control of potentials applied to an input or control circuit connected between the input terminal I and the common terminal C. The load circuit includes in series an inductance coil 8 and a D.-C. source such as battery 7. It may be assumed that in the absence of application of a trigger pulse to the trigger pulse input terminals in the control circuit, conditions are such in the control circuit (as via the provision of suitable bias by a source not illustrated) that the bi-directionally conductive switch 6 is effectively closed at a time $t_0$. The current flowing through the inductance 8 during the subsequent period while switch 6 is closed will rise in magnitude at a rate which may be substantially linear. This is illustrated in current waveform *a* as shown in Fig. 3. At a subsequent time $t_1$ a trigger pulse (as illustrated by waveform *b* of Fig. 3) is applied to the switch's control circuit, of the appropriate magnitude and polarity to reverse conditions in the control circuit such that switch 6 effectively opens the load circuit. Assuming some distributed capacitance in the inductance coil 8, the energy stored in the inductance coil 8 will then begin to discharge through its distributed capacitance in an oscillatory manner. If the trigger pulse is of the proper duration, its termination will permit switch 6 to close the load circuit again at a time $t_2$ when the oscillatory current through inductance 8 has reached its peak in a direction which is the reverse of the direction of current flow prevailing during the $t_0$–$t_1$ period. Current then continues to flow in the load circuit in the "reverse" direction as the inductance coil 8 returns its stored energy to the D.-C. source with a current decreasing with time at a substantially linear rate. This "reverse" current condition continues until a time $t_3$ when current equilibrium is reached. The operating cycle now repeats as the source 7 delivers a current linearly increasing with time to the inductance 8 until another trigger pulse is applied to open the load circuit.

If the opening and closing of switch 6 is solely determined by the timing of the leading and trailing edges of the trigger pulse in waveform *b*, it will be appreciated that the width or time duration of the trigger pulse is rather critical. If the duration of the trigger pulse is less than the half cycle period of oscillation for current through inductance 8 and its shunt capacity, the switch 6 will close at a time before the oscillatory current in inductance 8 has reached its peak in the reverse direction. This is illustrated in Fig. 3 by the dotted line labeled *s'*, which represents the current waveform resulting when the trigger pulse has a width (illustrated by the dotted lines of waveform *b*) narrower than the critical width. It will, of course, be appreciated that waveform *s'* as well as the other waveforms illustrated in Fig. 3 are in idealized form.

As may be observed by comparing the area enclosed by the dotted line curve below the zero axis with the adjacent areas enclosed by the current curve above the zero axis, the efficiency of the sawtooth wave generation is significantly affected since only a small portion of the energy stored in the inductance 8 during the first portion of a cycle is returned to the source 7 during the succeeding "reverse" current portion of the cycle. A relative flattening of the upper peak of the generated sawtooth may also result, depending upon the nature and capacity of the source 7 employed. In order that full advantage may be taken of the efficiency possible with the switch type of sawtooth wave generator, and the possibility of distortion be avoided, irrespective of the width of the trigger pulse, the control circuit illustrated in Fig. 1 includes an inductance coil 9 coupled to the coil 8. Waveform *c* of Fig. 3 illustrates the voltage developed across inductance coil 8 when the current waves of the shape illustrated by waveform *a* flow therethrough. It may be observed that the voltage across coil 8, which is the derivative of the current flowing therethrough, is substantially constant and of one polarity during the $t_0$–$t_1$ and $t_2$–$t_3$ periods when the coil current is changing at a substantially linear rate. However, during the $t_1$–$t_2$ period, when the coil current passes through a half cycle of oscillation, the voltage across coil 8 also passes through a half cycle oscillation which is 90° out of phase with the current. Thus, a demi-sinusoidal pulse is developed across coil 8 whenever the current in coil 8 oscillates from a peak value in one direction to a peak value in another direction.

The secondary coil 9 may thus derive via its inductive coupling to coil 8 a voltage pulse of appropriate switch-opening polarity which necessarily is of the proper width for switch control of the generation of non-distorted sawtooth waves. Thus, in the generalized illustration of Fig. 1 a "retrace" pulse derived from coil 8 itself is applied to the switch's control circuit in addition to the incoming trigger pulse. So long as the incoming trigger pulse duration is less than the oscillatory half cycle period the composite control pulse obtained by adding the retrace pulse to the trigger pulse will always be of proper width to cause switch 6 to close at the precise time when the oscillatory current in the inductance 8 has reached its peak in the "reverse" direction. Waveform *d* illustrates the appearance of the composite control pulse resulting from the addition of a retrace pulse to a trigger pulse of an unduly short time duration, discussed previously as illustrated by the dotted line in waveform *b*.

Figures 2, 4:
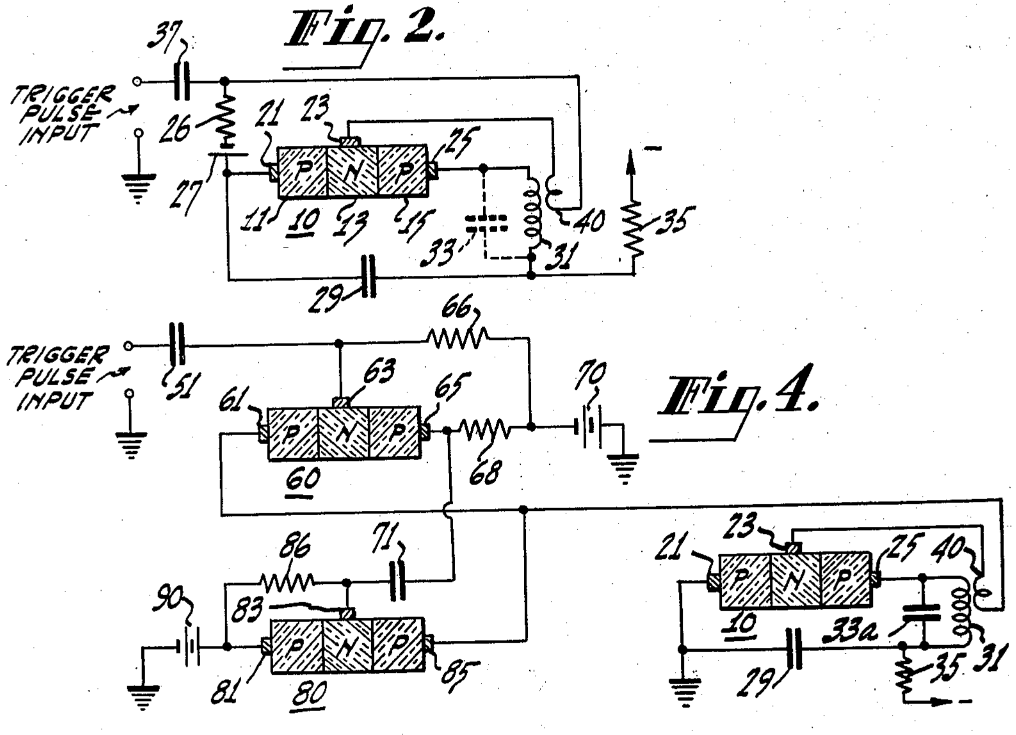
Fig. 2 illustrates schematically a particular embodiment of the present invention in which a junction transistor functions as the bi-directional switch.
Fig. 4 illustrates schematically application of a particular form of bias reversing circuit to a sawtooth current wave generator of the type illustrated in Fig. 2.

Fig. 2 illustrates the application of the principles of the invention generally described with respect to Fig. 1 to a sawtooth current wave generator of the switch type disclosed in the aforementioned patent of Sziklai, 2,728,857. A junction transistor 10 of the p-n-p type is shown having an n-type region 13 interposed between two p-type regions 11 and 15. Electrodes 21, 23 and 25, making non-rectifying contacts with the respective regions 11, 13 and 15, will be referred to as emitter, base, and collector, respectively. With emitter 21 grounded, a control circuit including a resistor 26 and a bias source, such as battery 27, is connected between the base 23 and the grounded emitter 21. The battery connections are such as to forwardly bias base 23 with a negative potential relative to the grounded emitter. An inductance coil 31, having a net distributed capacitance represented by capacitor 33 (illustrated in dotted lines), is connected in series with a bias source, the charged capacitor 29, between the collector 25 and the grounded emitter 21. The collector side of capacitor 29 is connected via resistor 35 to a suitable source of negative potential. Periodically recurring voltage pulses (such as those illustrated by waveform *b*) of positive polarity relative to ground are applied, from a suitable source connected to the terminals labeled "trigger pulse input," via capacitor 37 to the base-emitter control circuit.

In addition, the base-emitter control circuit includes a winding 40 which is inductively coupled to the coil 31. The operation of the circuit, apart from the effect of winding 40, is described in detail in the aforementioned Sziklai application and is similar to the general description of the operation of the system shown in Fig. 1. That is, in the absence of an incoming trigger pulse the forward bias provided by the bias source 27 in the control circuit connected between the common switch terminal (emitter 21) and the input terminal (the base 23), is such as to close the load circuit connected between the common terminal (emitter 21) and the output terminal (collector 25). The linearly increasing current illustrated by waveform *a* will, at the commencement of operation, flow through the emitter-collector path of the transistor 10 in the emitter-to-collector direction. However, when a trigger pulse is applied to the control circuit to temporarily impart a reverse bias condition thereto, the emitter-collector path of transistor 10 is effectively open-circuited and the current in coil 31 undergoes the half cycle oscillation previously described. When the control circuit subsequently returns to a forward bias condition, the load circuit is again closed and the current flows therethrough in the "reverse" direction at a linearly decreasing rate, returning the energy stored in inductance 31 to the capacitor 29.

The duration of the reverse bias condition in the control circuit is, however, in accordance with the previously described principles of the present invention, not solely determined by the trigger pulse width due to the presence of the winding 40 in the control circuit. The direction of winding of the coil 40 and its connection in the control circuit are such as to apply to the base 23 a voltage pulse, derived via its coupling to coil 31, which is of the proper polarity to add to the effect of the trigger pulse in maintaining a reverse bias condition in the control circuit. Since the retrace pulse derived by winding 40 necessarily terminates (i. e., passes through zero) at a precise time when the coil current is at a peak in the "reverse" direction, efficient operation of the sawtooth current wave generator is insured, irrespective of the width of the incoming trigger pulse, providing this width does not exceed the desired half cycle oscillatory period.

In Fig. 4, the sawtooth current generator of Fig. 2 incorporating transistor 10 as a bi-directional switch is shown in conjunction with a driving circuit of the pulse amplifier type, as disclosed in the co-pending application of George C. Sziklai and Robert D. Lohman, Serial No. 320,542, filed November 14, 1952, and entitled Power Amplifiers. In accordance with an embodiment of the invention disclosed in that application, the pulse amplifier driving circuit shown in Fig. 4 includes a pair of junction transistors 60 and 80 of the p-n-p type. The transistor 60 is conventionally provided with an emitter electrode 61, base electrode 63, and collector electrode 65; correspondingly, the transistor 80 is provided with an emitter electrode 81, base electrode 83, and collector electrode 85.

A substantial forward bias between base 63 and emitter 61 of transistor 60 is provided by connecting the base 63 via the resistor 66 to the negative terminal of the collector voltage supply, battery 70 and by connecting the emitter 61 through the load (i. e., base-emitter path of transistor 10) to ground. The transistor 60 is thus normally in a heavily conductive state, and a substantial current normally flows in a circuit including the load, the emitter-collector path of transistor 60, the collector resistor 68, and the collector voltage supply, battery 70. The direction of this normal current flow through the load is toward the emitter 61.

The second transistor 80, is normally cut off, the base 83 being conected via resistor 86 to the positive terminal of the emitter voltage supply, battery 90, to which the emitter 81 is directly connected. The collector 85 is directly connected to that terminal of the load to which the emitter 61 of the transistor 60 is also connected. However, with the transistor 80 in a non-conductive state, there is normally no completed D. C. path between the battery 90 and the load.

When an input pulse, of positive polarity relative to ground and of requisite amplitude, appears at the trigger pulse input terminals and is applied via capacitor 51 to the base 63 of trinsistor 60, the base 63 is driven to a potential more positive than the potential of emitter 61, and transistor 60 cuts off. When current ceases to flow through the collector resistor 68, the collector 65 drops to the potential of battery 70. The negative voltage pulse thus generated is applied via capacitor 71 to the base 83 of the transistor 80, driving the base 83 to a potential more negative than the potential of emitter 81 and thus rendering the transistor 80 heavily conductive.

Thus, during the signal pulse interval, a D. C. path is completed between the battery 90 and the load through the now conductive emitter-collector path of transistor 80, while the normally closed D. C. path between the battery 70 and the load is open due to the cut-off of transistor 60. Current flow through the load during the signal pulse interval is therefore in a direction opposite to the direction of the normal current flow, the current supplied by battery 90 flowing out of collector 85 through the load.

It will be appreciated that the operation of the pulse amplifier is somewhat analogous to the operation of a single-pole double-throw switch. That is, in the absence of an input pulse, the "switch" is thrown to a first position, due to the conduction of transistor 60, connecting the base 23 of the transistor 10 through collector resistor 68 to battery 70. In the presence of an input pulse, the connection of base 23 to battery 70 is opened by the cut-off of transistor 60, and the "switch" is thrown to a second position, due to the conduction of transistor 80, connecting base 23 to the battery 90.

A description of the operation of the sawtooth current generator in Fig. 4 is similar to the foregoing descriptions of Figs. 1, 2 and 3. That is, during the initial $t_0$–$t_1$ period, forward bias in the control circuit (provided by battery 70) permits flow of a linearly increasing current supplied by source 29 in the load circuit, storing energy in the inductance 31. During the $t_1$–$t_2$ retrace period, initiated by the application of a trigger pulse to the "trigger pulse input" terminals, application of a reverse bias (provided by battery 90) to the control circuit, reverses the current flow in the base-emitter path of transistor 10, and effectively opens the load circuit, permitting the current in the inductance 31 to pass through a half-cycle of oscillation. During the $t_2$–$t_3$ period, the return of the control circuit to a forward bias condition again closes the load circuit, and current flows therethrough in the "reverse" direction at a linearly decreasing rate, returning the energy stored in the inductance 31 to the source 29.

Again in accordance with the principles of the present invention, the secondary coil 40, inductively coupled to the coil 31, is included in the base lead to substantially preclude premature closing of the load circuit. Thus, while the trigger pulse applied to the "trigger pulse input" terminals initiates the retrace portion of the generated sawtooth wave, the retrace pulse derived by coil 40 determines the timing of the termination of this retrace portion, substantially insuring that the retrace interval has a fixed time duration essentially equal to half the resonance period for the inductance 31 and its shunt capacity. It may be appreciated that whereas the description of Fig. 2 referred only to the distributed capacitance of coil 31 as determining the shunt resonance period, it is readily within the scope of the aforementioned Sziklai application and the instant application to include a lumped capacitance 33*a* in shunt with the coil 31 to effect tuning to a particularly desired resonance period value.

As more fully explained in the aforementioned Sziklai patent, it is desirable that the bi-directional switch transistor 10 be a "symmetrical" transistor: i. e., a transistor in which the control current-load current characteristic for one direction of flow of load current is essentially symmetrical with the control current-load current characteristic for the opposite direction of flow of load current. Not all junction transistors attain this condition of symmetry; primarily as a consequence of the particular procedure employed in their fabrication or development, some junction transistors present a substantially greater impedance to current flow in one direction between the outer zones, for a given set of bias conditions, than they present to current flow in the opposite direction between the outer zones under equivalent bias conditions.

While there are many contributing factors which may determine the presence or lack of symmetry in the aforementioned charateristics of the junction transistor, it is believed by the applicant that if the resistivities of the two outer zones are substantially equal and if the two junctions are symmetrical (i. e., if the junction between the one outer zone and the intermediate zone is substantially equal in magnitude or extent to the junction between the other outer zone and the intermediate zone), a sufficient degree of symmetry in these current characteristics will be achieved to permit the consideration of the unit as a "symmetrical" junction transistor.

As an alternative to the use of a "symmetrical" transistor in the circuits of the present invention, a pair of "asymmetrical" transistors may be used, wherein the connection in reverse parallel relation of the emitter-collector paths of two transistors, both of the same type and having similar asymmetries in their control current-load current characteristics, effectively provides the equivalent of the emitter-collector path of a "symmetrical" transistor.

It may readily be appreciated that whereas junction transistors of the p-n-p type have been shown in the illustrated embodiments, junction transistors of the n-p-n type are equally applicable to the circuits of the present invention. With appropriate reversals of voltage polarities, the same type of operation may be achieved with the circuits of the invention with an n-p-n junction transistor substituted as the switching device. It is also believed that embodiments employing "non-formed" transistors of the so-called point-contact type with circuit and electrode connections similar to those illustrated are also feasible. However, where the available point-contact transistor units have a tendency toward instability in a base input type of circuit arrangement, the embodiments employing transistors of the junction type will be preferable.

While useful wherever sawtooth current waves are required, the circuits of the present invention are of significant utility in electromagnetic deflection systems associated with cathode ray tubes. Thus, for example, the circuits of Fig. 2 or 3 may constitute the horizontal deflection system for a television receiver, with horizontal synchronizing pulses being applied to the "trigger pulse input" terminals, and with inductance 31 being the horizontal deflection coils of the receiver's kinescope.

Having thus described my invention, what I claim as new and desire to secure by Letters Patent is:

In a system including a source of periodic pulses, a sawtooth current wave generator comprising the combination of a first transistor including base, emitter, and collector electrodes, a load circuit including an inductive load and a potential source connected between said emitter and collector electrodes, means coupled to said base electrode for normally rendering the transistor current path between said emitter and collector electrodes conductive and including a second transistor which is normally conducting and which normally provides a connection between said base electrode and a source of forward biasing potential, means for periodically cutting off said second transistor and thereby opening the connection between said base electrode and said forward biasing potential source in response to said periodic pulses, means additionally coupled to said base electrode for periodically rendering said current path non-conducting and including a third transistor which is normally non-conductive but which is rendered conducting in response to a cut off of said second transistor, said third transistor, when conductive, providing a connection between said base electrode and a source of reverse biasing potential, a coil inductively coupled to said inductive load for deriving a pulse therefrom when said current path is rendered non-conductive, and means for applying said derived pulse to said base electrode.

References Cited in the file of this patent

UNITED STATES PATENTS

| | | |
|---|---|---|
| 2,063,025 | Blumlein | Dec. 8, 1936 |
| 2,085,402 | Vance | June 29, 1937 |
| 2,456,754 | Sziklai | Dec. 21, 1948 |
| 2,469,347 | Shockley | Sept. 25, 1951 |
| 2,655,609 | Shockley | Oct. 13, 1953 |
| 2,657,360 | Wallace | Oct. 27, 1953 |
| 2,681,995 | Adler | June 22, 1954 |
| 2,691,073 | Lowman | Oct. 5, 1954 |
| 2,728,857 | Sziklai | Dec. 27, 1955 |